(12) United States Patent
Mehlan et al.

(10) Patent No.: US 12,233,688 B2
(45) Date of Patent: Feb. 25, 2025

(54) REFRIGERATION ARRANGEMENT FOR A MOTOR VEHICLE

(71) Applicant: Siemens Mobility GmbH, Munich (DE)

(72) Inventors: Markus Mehlan, Karlsfeld (DE); Rainer Wichmann, Feldkirchen (DE)

(73) Assignee: Siemens Mobility GmbH, Munich (DE)

( * ) Notice: Subject to any disclaimer, the term of this patent is extended or adjusted under 35 U.S.C. 154(b) by 862 days.

(21) Appl. No.: 17/413,648

(22) PCT Filed: Nov. 14, 2019

(86) PCT No.: PCT/EP2019/081289
§ 371 (c)(1),
(2) Date: Jun. 14, 2021

(87) PCT Pub. No.: WO2020/120063
PCT Pub. Date: Jun. 18, 2020

(65) Prior Publication Data
US 2022/0080809 A1     Mar. 17, 2022

(30) Foreign Application Priority Data
Dec. 14, 2018   (DE) .......................... 102018221771.8

(51) Int. Cl.
*B60H 1/32*   (2006.01)
*B61D 27/00*  (2006.01)
(Continued)

(52) U.S. Cl.
CPC ..... *B60H 1/32284* (2019.05); *B61D 27/0018* (2013.01); *F25B 7/00* (2013.01); *F25B 23/006* (2013.01); *F25B 25/005* (2013.01)

(58) Field of Classification Search
CPC ... B60H 1/32284; B61D 27/0018; F25B 7/00; F25B 23/006; F25B 25/005
(Continued)

(56) References Cited

U.S. PATENT DOCUMENTS

| | | |
|---|---|---|
| 1,890,463 A | 12/1932 | Herman |
| 4,890,463 A | 1/1990 | Cantoni |

(Continued)

FOREIGN PATENT DOCUMENTS

| | | |
|---|---|---|
| CN | 2860912 Y | 1/2007 |
| CN | 101251317 A | 8/2008 |

(Continued)

OTHER PUBLICATIONS

Klampfl, Johannes, WO2018024359 Translation.pdf, "Air-conditioning device for a vehicle, and vehicle having such an air-conditioning device", Feb. 2008, pp. 1-20.*

(Continued)

*Primary Examiner* — Avinash A Savani
*Assistant Examiner* — Ryan L Faulkner
(74) *Attorney, Agent, or Firm* — Laurence A. Greenberg; Werner H. Stemer; Ralph E. Locher

(57) ABSTRACT

A refrigeration arrangement for traction vehicles includes a first closed circuit configured as a compression refrigeration machine containing a refrigerant as a first carrier medium, evaporator and condenser. The evaporator absorbs heat into the first circuit. The condenser transfers heat from the first circuit. The first circuit is coupled, via the evaporator, to a closed second circuit containing a liquid second carrier medium for heat transport. The second circuit, for cooling, takes heat and transfers it to the second carrier medium. The heat is conveyed, by the second carrier medium, to the evaporator for transfer to the first circuit. The first circuit is coupled, via the condenser, to a closed third circuit contain- (Continued)

ing a liquid third carrier medium for heat transport. The third circuit causes heat from the first circuit, transferred into the third circuit by the condenser, to be transferred to surroundings with heat from traction systems.

4 Claims, 2 Drawing Sheets

(51) Int. Cl.
  *F25B 7/00* (2006.01)
  *F25B 23/00* (2006.01)
  *F25B 25/00* (2006.01)
(58) Field of Classification Search
  USPC ......................................................... 454/105
  See application file for complete search history.

(56) References Cited

U.S. PATENT DOCUMENTS

| | | |
|---|---|---|
| 5,421,169 A | 6/1995 | Benedict |
| 6,449,980 B1 | 9/2002 | Minister |
| 2008/0196877 A1 | 8/2008 | Zeigler et al. |
| 2009/0260387 A1* | 10/2009 | DeFrancesco ......... B64D 13/08 |
| | | 62/401 |
| 2014/0069135 A1 | 3/2014 | Mortreux |
| 2018/0328643 A1 | 11/2018 | Eddy et al. |

FOREIGN PATENT DOCUMENTS

| | | | |
|---|---|---|---|
| CN | 201095301 Y | 8/2008 | |
| CN | 108351129 A | 7/2018 | |
| DE | 69320142 T2 | 12/1998 | |
| DE | 102015002166 A1 | 8/2016 | |
| FR | 2946415 A1 * | 12/2010 | ......... B60H 1/00492 |
| WO | 2018024359 A1 | 2/2018 | |

OTHER PUBLICATIONS

Neveu, Daniel, FR2946415 Translation.pdf, "Systeme de gestion thermique comprenant", Dec. 2010, pp. 1-16.*

* cited by examiner

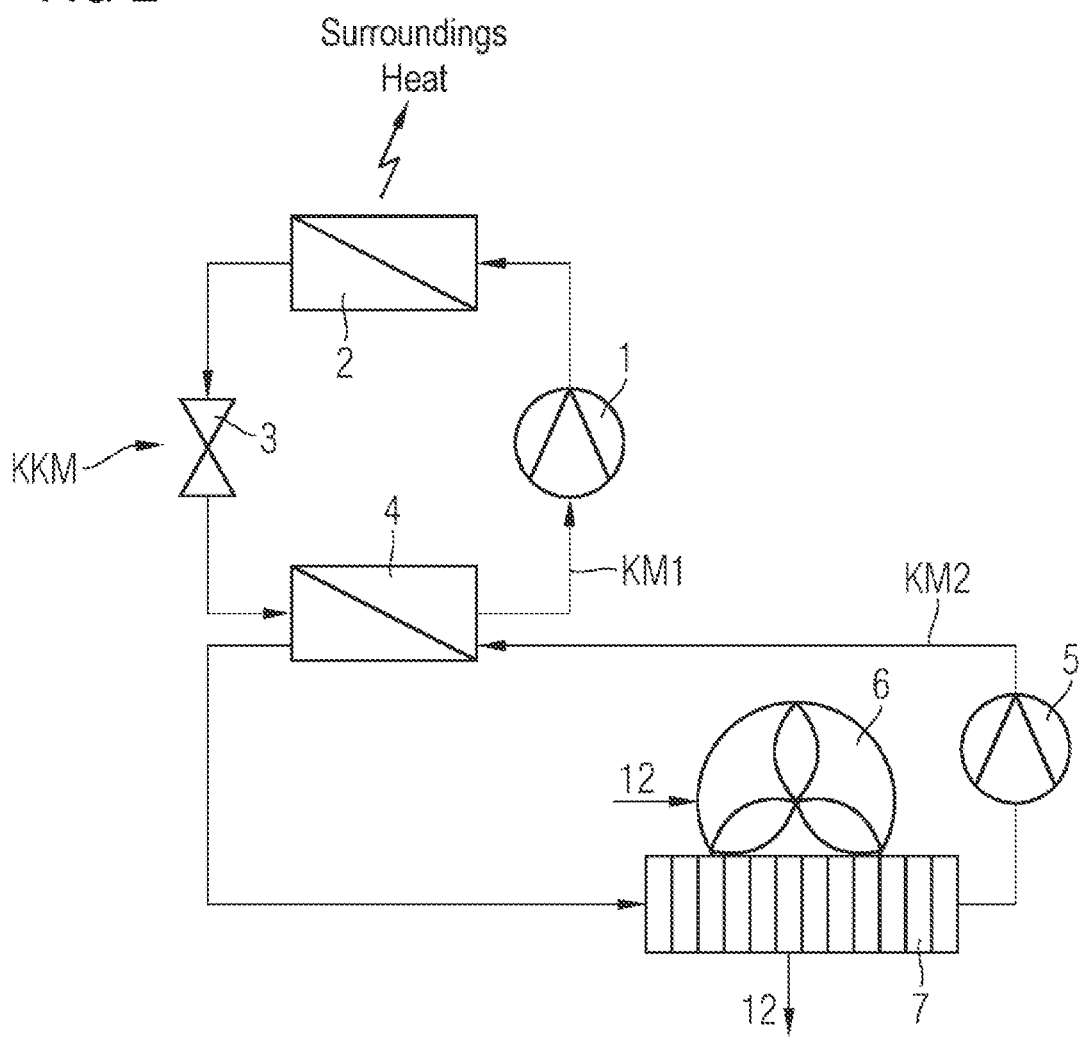

REFRIGERATION ARRANGEMENT FOR A MOTOR VEHICLE

BACKGROUND OF THE INVENTION

Field of the Invention

The invention relates to a refrigeration arrangement for a traction vehicle.

For the direct cooling of components or for the air-conditioning of passenger compartments or usable spaces of traction vehicles, refrigeration machines and cooling means are used. The structural space available for the air-conditioning units and cooling units, and the weight thereof, are limited by the required structural space and weight for traction systems, vehicle structure and passengers, by specified bend radii, and by maximum axle loads that must be adhered to.

Components required for air-conditioning or cooling that is to be performed should be operable independently of other train components in order to ensure modular and decoupled air-conditioning of compartments or cooling of components.

An EU directive relating to fluorinated greenhouse gases restricts the use of refrigerants with high "global warming potential". Refrigerants with low "global warming potential" are in turn often classed as combustible and can be used only with limitations in an air-conditioning arrangement of a rail vehicle—for example, they must not be used in the so-called "crash region" of the rail vehicle or traction vehicle.

Use of non-combustible refrigerants is possible, but these exhibit relatively poor efficiency in the presence of high ambient temperatures, and result in a considerable increase in costs. In the case of some refrigerants, the operating pressure greatly increases at high temperature owing to a transcritical process. Correspondingly, very high levels of pressure resistance, and thus highly specialized components, are then required.

For refrigeration in a rail vehicle or traction vehicle, it is known to use a compression refrigeration machine KKM. An exemplary embodiment, with the use of the cold for air-conditioning purposes, is shown in FIG. 2.

The compression refrigeration machine KKM has, as main components, a compressor 1, a condenser 2, a restrictor 3, an evaporator 4 and a carrier medium.

The carrier medium is used to transport cold or heat within a circuit.

A carrier medium KM1, which has the function of a refrigerant, moves in a closed first circuit composed of the abovementioned main components. The carrier medium KM1 undergoes various changes in state of aggregation in succession.

The carrier medium KM1 of the first circuit will hereinafter also be referred to as first carrier medium KM1.

The gaseous first carrier medium KM1 is compressed by the compressor 1 and conducted to the downstream condenser 2.

In the condenser 2, the first carrier medium KM1 condenses or liquefies and releases heat. Here, the heat is released to the ambient air around the rail vehicle or traction vehicle. The condenser 2 is designed as a liquid-air heat exchanger.

The liquid first carrier medium KM1 passes to the restrictor 3 that is connected downstream of the condenser 2.

Owing to a change in pressure, the liquid first carrier medium KM1 is expanded across the restrictor 3 and passes to the evaporator 4 that is connected downstream of the restrictor 3.

In the evaporator 4, the first carrier medium KM1 evaporates, absorbing heat at relatively low temperature.

By means of the evaporator 4, the first carrier medium KM1 absorbs heat from a second circuit, which is likewise closed and contains a carrier medium KM2. The evaporator 4 is designed as a liquid-liquid heat exchanger.

The evaporator 4 is incorporated into the second circuit composed of a compressor 5, a fan 6, a heat exchanger 7 and the carrier medium KM2.

The carrier medium KM2, which has the function of a refrigerant or heat carrier, and which is for example a liquid coolant, moves in the closed second circuit composed of the abovementioned components.

Here, the carrier medium KM2 does not undergo any changes in state of aggregation.

The fan 6 transports air 12, which is drawn in from a usable space (for example a passenger compartment, the driver's station of the traction vehicle or rail vehicle, etc.), through the heat exchanger 7.

The heat exchanger 7 is designed as an air-liquid heat exchanger and cools the air 12 supplied to it, by extracting the heat of said air and transferring said heat to the carrier medium KM2 of the second circuit.

The carrier medium KM2 of the second circuit will hereinafter be referred to as second carrier medium KM2.

The warmed second carrier medium KM2 passes, with the aid of the compressor 5, from the heat exchanger 7 to the evaporator 4.

As discussed, the evaporator 4 extracts heat from the second carrier medium KM2, such that, ultimately, the second carrier medium KM2 is cooled.

The cooled second carrier medium KM2 is supplied to the heat exchanger 7 and is used there for cooling, or for extracting heat from, the supplied air 12.

In summary, in the second circuit, heat is extracted from the air 12 and transported to the evaporator 4. By means of the evaporator 4, the heat is transferred from the first circuit to the second circuit and transported to the condenser 2. By means of the condenser 2, the heat is released from the first circuit to the environment.

Owing to the heat exchangers 2, 4 and 7 that are used, the coupled circuits have a limited overall cooling power.

Document WO 2018/024359 A1 has disclosed an air-conditioning device for a bus.

Document DE 102015002166 A1 has disclosed a vehicle air-conditioning system.

SUMMARY OF THE INVENTION

It is the object of the present invention to specify an improved refrigeration arrangement for a traction vehicle, in particular for passenger compartments or useful spaces of the traction vehicle.

Said object is achieved by means of the features described below. Advantageous refinements are specified in the further claims.

The invention relates to a refrigeration arrangement for a traction vehicle, having a closed first circuit which is designed as a compression refrigeration machine and which contains a refrigerant as first carrier medium and an evaporator and also a condenser. The evaporator is designed to absorb heat into the first circuit. The condenser is designed to release heat from the first circuit.

The first circuit is coupled via the evaporator to a closed second circuit, which is preferably part of the traction vehicle. The second circuit contains a liquid second carrier medium for transporting heat.

The second circuit is designed such that, for cooling purposes, heat is extracted at a predetermined location and transferred to the second carrier medium (KM2). The heat passes by means of the second carrier medium to the evaporator for the transfer of heat to the first circuit.

The second circuit is preferably designed such that, for the cooling of a component of the traction vehicle and/or for the cooling of a passenger compartment of the traction vehicle, heat is extracted from the component and/or heat is extracted from the air of the passenger compartment and transferred to the second carrier medium (KM2). The transferred heat passes by means of the second carrier medium to the evaporator (4) for the transfer of heat to the first circuit.

The passenger compartment is preferably part of the traction vehicle.

The first circuit is coupled via the condenser to a closed third circuit, which is preferably part of the traction vehicle. The third circuit contains a liquid third carrier medium for transporting heat. The third circuit is designed such that heat of the first circuit that is transferred by means of the condenser into the third circuit is transferred together with heat of traction systems of the traction vehicle to the environment or surroundings around the traction vehicle.

In accordance with standards, a refrigerant is to be understood to mean a working medium or a fluid that is used for heat transfer in a refrigeration system and which absorbs heat at low temperature and low pressure and releases heat at relatively high temperature and relatively high pressure. Changes in state of the fluid commonly occur in the process.

The first circuit is advantageously configured such that heat is transferred via the evaporator to the first carrier medium and passes by means of the latter to the condenser for the release of heat.

The second circuit advantageously comprises a heat exchanger, such that heat is extracted from the air of the passenger compartment by means of the heat exchanger and transferred to the second carrier medium and the heat passes by means of the second carrier medium to the evaporator for the transfer of heat to the first circuit.

The third circuit advantageously comprises a first heat exchanger and a second heat exchanger. The second heat exchanger is designed for cooling the traction systems of the traction vehicle and is arranged such that heat of the first circuit is transferred via the condenser to the third carrier medium and, by means of the third carrier medium, the heat of the first circuit passes, together with the heat of the traction systems provided by the second heat exchanger, to the first heat exchanger, which then transfers the summed heat to the ambient air.

It is advantageously the case that, in addition to the condenser, the evaporator and the first carrier medium, the first circuit additionally has a compressor and a restrictor. These form a closed circuit such that the first carrier medium passes from the evaporator via the compressor to the condenser and from the condenser via the restrictor back to the evaporator.

It is advantageously the case that, in addition to the evaporator, the heat exchanger and the second carrier medium, the second circuit additionally has a compressor. These form a closed circuit such that the second carrier medium passes from the heat exchanger via the compressor to the evaporator and from the evaporator back to the heat exchanger.

It is advantageously the case that, in addition to the condenser, the first and the second heat exchanger and the third carrier medium, the third circuit additionally has a compressor. These form a closed circuit such that the third carrier medium passes from the condenser via the compressor to the second heat exchanger and from the latter via the first heat exchanger back to the condenser.

The second and/or the third carrier medium is advantageously designed to transport cold or heat as refrigerant or heat carrier within the respective closed circuit.

It is advantageously the case that the second and/or the third carrier medium does not change its state of aggregation during the transport of the cold or heat.

The evaporator and the condenser of the first circuit are advantageously designed as liquid-liquid heat exchangers.

The heat exchanger of the second circuit is advantageously designed as an air-liquid heat exchanger.

The first heat exchanger of the third circuit is advantageously designed as a liquid-air heat exchanger.

In a preferred refinement, water, in particular a water with an added antifreeze agent (for example Antifrogen), is used as second and/or as third carrier medium.

In a preferred refinement, the evaporator of the first circuit is used directly for the cooling or dehumidification of the air.

In a preferred refinement, multiple first circuits are constructed in a cascaded configuration and then interact correspondingly.

In a preferred refinement, further liquid circuits are connected between the first circuit and the third circuit.

In a preferred refinement, refrigeration power that is dissipated in the evaporator is used for cooling other components of the traction vehicle (for example for cooling batteries).

By means of the present invention, structural space is saved because the condenser of the first circuit is designed as a liquid-liquid heat exchanger.

By means of the coupling of the first and the third circuit by means of the condenser, only a minor modification has to be made to the traction system cooling circuit which is present in the traction vehicle and of which, according to the invention, joint use is made.

Owing to the only small structural space that is required, the present invention allows a relatively free selection of the position of the components of the cooling arrangement in the traction vehicle.

The present invention makes it possible to realize a central cooling concept (for example one cooling arrangement is provided for each traction vehicle) or a decentralized concept (for example one cooling arrangement is provided for each passenger compartment).

Owing to the interaction of the three circuits, hitherto required cooling power can be saved. In this way, structural space, weight and construction and manufacturing costs of the traction vehicle are saved.

The following consideration of a heating situation (that is to say cold ambient air and heating demand in the passenger compartment) demonstrates a further advantage:

Via the first circuit in a "heat pump" operating mode, it is also possible for heat to be extracted from the third carrier medium and supplied to the second circuit. The energy demand for required heating of the passenger compartment is thus reduced. At the same time, the third carrier medium is cooled such that the fan of the third circuit can be operated in energy-saving fashion (that is to say it is operated at a slower rotational speed and/or with shorter activation periods).

Owing to the volume-based thermal conductivity of the liquid carrier media, structurally determined heat transfer coefficients in the heat exchangers are several times higher than in the case of air being used for dissipating heat at the condenser.

Owing to the heat capacity of the liquid carrier media, the volume required for transporting thermal power is several times smaller than in the case of the known use of air for dissipating heat at the condenser.

The highest levels of cooling power of the traction system are required in the presence of high levels of traction power (that is to say in the presence of a high product of traveling speed and traction force). In the presence of high traveling speeds, the walls of the traction vehicle that are heated by solar radiation are cooled by the relative wind. In this way, at high traveling speeds, the highest refrigeration power of the air-conditioning arrangement is not required. This synergy can be utilized to lower a total installed cooling power.

The above-described free positioning also makes it possible to continue to use combustible refrigerants in predetermined regions (for example in the exterior region). Here, it is ensured by means of simple safety measures (for example a CO2 extinguishing system) that fires are quickly extinguished as soon as they form.

The present invention will be discussed in more detail below, by way of an example, on the basis of a drawing.

BRIEF DESCRIPTION OF THE SEVERAL VIEWS OF THE DRAWING

FIG. 2 shows the use, discussed in the introductory part of the description, of a compression refrigeration machine for the air-conditioning of a rail vehicle.

DETAILED DESCRIPTION OF THE INVENTION

Figure 1:
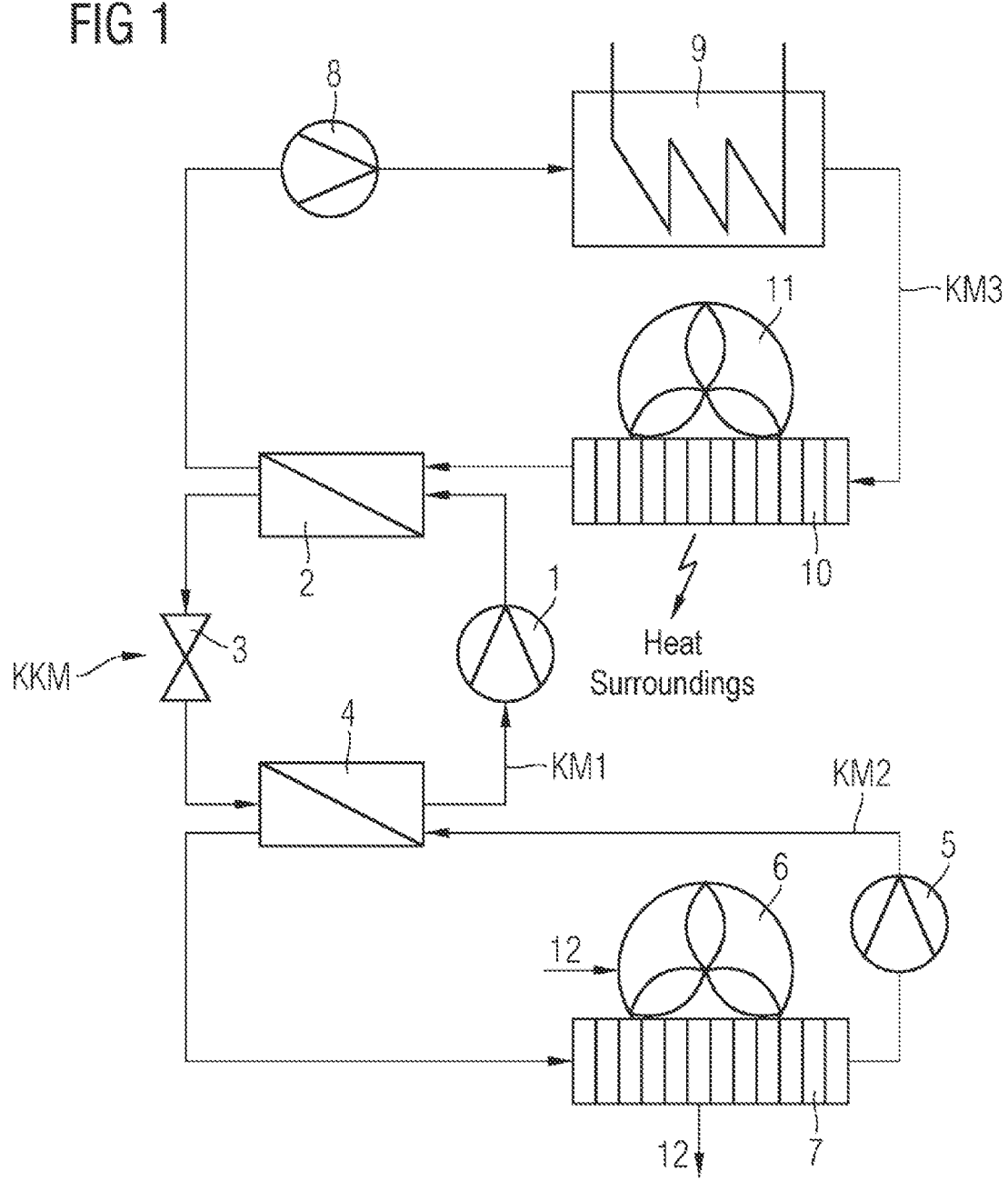
FIG. 1 shows the arrangement according to the invention in a schematic circuit diagram.

FIG. 1 shows the arrangement according to the invention in a schematic circuit diagram.

The compression refrigeration machine KKM has, as main components, a compressor 1, a condenser 2, a restrictor 3, an evaporator 4 and a carrier medium KM1.

The carrier medium KM1 is used to transport cold or heat within the first circuit.

The carrier medium KM1, which has the function of a refrigerant, moves in the closed first circuit composed of the abovementioned main components.

The carrier medium KM1 undergoes various changes in state of aggregation in succession. The carrier medium KM1 of the first circuit will hereinafter also be referred to as first carrier medium KM1.

The gaseous first carrier medium KM1 is compressed by means of the compressor 1 and conducted to the downstream condenser 2.

In the condenser 2, the first carrier medium KM1 condenses or liquefies and releases heat.

The liquid first carrier medium KM1 passes to the restrictor 3 that is connected downstream of the condenser 2.

Owing to a change in pressure, the liquid first carrier medium KM1 is expanded across the restrictor 3 and passes to the evaporator 4 that is connected downstream of the restrictor 3.

In the evaporator 4, the first carrier medium KM1 evaporates, absorbing heat at relatively low temperature.

By means of the evaporator 4, the first carrier medium KM1 absorbs heat from a second circuit, which is likewise closed and contains a carrier medium KM2. The evaporator 4 is designed as a liquid-liquid heat exchanger.

The evaporator 4 is incorporated into the second circuit composed of a compressor 5, a fan 6, a heat exchanger 7 and the carrier medium KM2.

The carrier medium KM2, which has the function of a refrigerant or heat carrier, and which is for example a liquid coolant, moves in the closed second circuit composed of the abovementioned components.

Here, the carrier medium KM2 does not undergo any changes in state of aggregation.

The fan 6 transports air 12, which is drawn in from a usable space (for example a passenger compartment, the driver's station of the traction vehicle or rail vehicle, etc.), through the heat exchanger 7.

The heat exchanger 7 is designed as an air-liquid heat exchanger and cools the air 12 supplied to it, by extracting the heat of said air and transferring said heat to the carrier medium KM2 of the second circuit.

The carrier medium KM2 of the second circuit will hereinafter be referred to as second carrier medium KM2.

The warmed second carrier medium KM2 passes, with the aid of the compressor 5, from the heat exchanger 7 to the evaporator 4.

As discussed, the evaporator 4 extracts heat from the second carrier medium KM2, such that, ultimately, the second carrier medium KM2 is cooled.

The cooled second carrier medium KM2 is supplied to the heat exchanger 7 and is used there for cooling, or for extracting heat from, the supplied air 12.

According to the invention, the condenser 2 of the compression refrigeration machine is designed as a liquid-liquid heat exchanger and is incorporated into a third circuit.

The third circuit in turn is provided in the traction vehicle in order to cool traction systems there.

The third circuit comprises a compressor 8, a fan 11, a heat exchanger 10 and a carrier medium KM3 in addition to the condenser 2.

The heat exchanger 10 is designed as a liquid-air heat exchanger.

The third circuit furthermore comprises a further heat exchanger 9, which is coupled to traction systems of the traction vehicle. By means of said further heat exchanger, heat of the traction systems is transferred to the carrier medium KM3 of the third circuit.

The carrier medium KM3 of the third circuit will hereinafter be referred to as third carrier medium KM3.

The third carrier medium KM3, which has the function of a refrigerant or heat carrier, and which is for example a liquid coolant, moves in the closed third circuit composed of the abovementioned components.

Here, the third carrier medium KM3 does not undergo any changes in state of aggregation.

The heat of the first circuit that is released via the condenser 2 is supplied to the third carrier medium KM3, which passes via the compressor 8 to the heat exchanger 9.

There, the third carrier medium KM3 absorbs further heat of the traction systems and is supplied to the heat exchanger 10.

By means of the fan 11, ambient air is supplied to the heat exchanger 10, which is designed as a liquid-air heat exchanger.

By means of the heat exchanger 10, the heat of the third carrier medium KM3 is transferred to the ambient air and thus removed from the third carrier medium KM3, which cools again and passes to the condenser 2 again.

In summary, in the second circuit, heat is extracted from the air 10 and transported to the evaporator 4. By means of the evaporator 4, the heat is transferred from the first circuit to the second circuit and transported to the condenser 2.

By means of the condenser 2, the heat is transferred from the first circuit to the third circuit and is transported to the heat exchanger 10.

By means of the heat exchanger 10, the heat is released to the environment, in particular to the ambient air.

The invention claimed is:

1. A refrigeration arrangement for a traction vehicle, the refrigeration arrangement comprising:
    a closed first circuit configured as a compression refrigeration machine including a refrigerant as a first carrier medium, an evaporator configured as a liquid-liquid heat exchanger, a condenser configured as a liquid-liquid heat exchanger, a compressor, and a restrictor, said first carrier medium passing from said evaporator through said compressor to said condenser and from said condenser through said restrictor back to said evaporator;
    a closed second circuit including said evaporator, a compressor, a fan, a heat exchanger and a liquid second carrier medium for transporting heat, said second carrier medium passing from said heat exchanger through said compressor to said evaporator and from said evaporator back to said heat exchanger of said closed second circuit;
    a closed third circuit including said condenser, a first heat exchanger, a second heat exchanger, a liquid third carrier medium for transporting heat, and a compressor, said third carrier medium passing from said condenser through said compressor to said second heat exchanger and from said second heat exchanger through said first heat exchanger back to said condenser;
    said closed second circuit being coupled by said the evaporator to said closed first circuit;
    said closed first circuit being coupled by said the condenser to said closed third circuit;
    said closed second circuit configured to cause, for cooling purposes, heat to be extracted at a predetermined location and transferred to said second carrier medium, the heat being carried by said second carrier medium to said evaporator for transferring heat to said closed first circuit;
    said closed first circuit configured to cause heat to be transferred by said evaporator to said first carrier medium and passed by said first carrier medium to said condenser for releasing heat to said closed third circuit;
    said second heat exchanger of said closed third circuit configured for cooling traction systems of the traction vehicle and for supplying heat of the traction systems to said third carrier medium; and
    said closed third circuit configured to transfer heat of said closed first circuit through said condenser to said third carrier medium and to transfer heat, together with the heat of the traction systems, through said first heat exchanger to the environment.

2. The arrangement according to claim 1, wherein said closed second circuit is configured, for cooling purposes, to extract heat from at least one of a component of the traction vehicle or a passenger compartment of the traction vehicle or air in the passenger compartment.

3. The arrangement according to claim 2, wherein said closed second circuit is configured to use said heat exchanger of said closed second circuit to extract heat from at least one of the component or the air in the passenger compartment and transfer the heat to said second carrier medium.

4. The arrangement according to claim 1, wherein:
    said heat exchanger of said closed second circuit is configured as an air-liquid heat exchanger;
    said first heat exchanger of said closed third circuit is configured as a liquid-air heat exchanger; and
    said second carrier medium and said third carrier medium are water with or without an added antifreeze agent.

* * * * *